(12) United States Patent
Lee

(10) Patent No.: US 12,362,396 B2
(45) Date of Patent: Jul. 15, 2025

(54) SECONDARY BATTERY

(71) Applicant: Samsung SDI Co., Ltd., Yongin-si (KR)

(72) Inventor: Hyun Soo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 395 days.

(21) Appl. No.: 17/894,045

(22) Filed: Aug. 23, 2022

(65) Prior Publication Data

US 2023/0140426 A1 May 4, 2023

(30) Foreign Application Priority Data

Nov. 2, 2021 (KR) ........................ 10-2021-0148842

(51) Int. Cl.
*H01M 10/0585* (2010.01)
*H01M 50/103* (2021.01)
(Continued)

(52) U.S. Cl.
CPC ..... *H01M 10/0585* (2013.01); *H01M 50/103* (2021.01); *H01M 50/166* (2021.01); *H01M 50/531* (2021.01); *H01M 50/538* (2021.01)

(58) Field of Classification Search
CPC ........... H01M 10/0585; H01M 50/103; H01M 50/166; H01M 50/176; H01M 50/531;
(Continued)

(56) References Cited

U.S. PATENT DOCUMENTS 9,692,034 B2 6/2017 Lee et al.
2015/0214536 A1 7/2015 Lee et al.
(Continued)

FOREIGN PATENT DOCUMENTS

JP 5558265 B2 7/2014
JP 2017-079139 A 4/2017
(Continued)

*Primary Examiner* — Kevin E Yoon
(74) *Attorney, Agent, or Firm* — Womble Bond Dickinson (US) LLP

(57) ABSTRACT

A secondary battery includes: a case accommodating an electrode assembly; a cap plate sealing the case; a negative electrode terminal and a positive electrode terminal on the cap plate; a first negative-electrode-current-collector plate extending along a lower side of the cap plate between the electrode assembly and the cap plate and having a first end electrically connected to the negative electrode plate and a second end electrically connected to the negative electrode terminal; and a first positive-electrode-current-collector plate extending along the lower side of the cap plate between the electrode assembly and the cap plate and having a first end electrically connected to the positive electrode plate and a second end electrically connected to the positive electrode terminal. The first positive-electrode-current-collector plate has a greater thickness than the first negative-electrode-current-collector plate, and the first negative-electrode-current-collector plate has a first protrusion that locally protrudes toward the electrode assembly.

19 Claims, 2 Drawing Sheets

(51) Int. Cl.
   *H01M 50/166* (2021.01)
   *H01M 50/531* (2021.01)
   *H01M 50/538* (2021.01)

(58) Field of Classification Search
   CPC .. H01M 50/533; H01M 50/55; H01M 50/553; H01M 50/557
   See application file for complete search history.

(56) References Cited

U.S. PATENT DOCUMENTS

| | | | |
|---|---|---|---|
| 2018/0358648 A1* | 12/2018 | Guen | H01M 4/662 |
| 2020/0091570 A1* | 3/2020 | Guen | H01M 50/562 |
| 2020/0303713 A1* | 9/2020 | Lee | H01M 50/533 |

FOREIGN PATENT DOCUMENTS

| | | |
|---|---|---|
| KR | 10-2165332 A | 10/2020 |
| WO | WO-2023007756 A1 * | 2/2023 |

\* cited by examiner

SECONDARY BATTERY

CROSS-REFERENCE TO RELATED APPLICATION

This application claims priority to and the benefit of Korean Patent Application No. 10-2021-0148842, filed on Nov. 2, 2021, in the Korean Intellectual Property Office, the entire contents of which are herein incorporated by reference.

BACKGROUND

1. Field

Aspects of embodiments relate to a secondary battery.

2. Description of the Related Art

A secondary battery is a rechargeable and dischargeable battery, different from a primary battery that is not designed to be charged (or recharged). A low-capacity secondary battery including only a single cell packaged in the form of a pack may be used for various portable small-sized electronic devices, such as cellular phones or camcorders, while a high-capacity secondary battery in which several tens of cells are connected to each other in a battery pack is widely used as a power source for motor driving, such as in hybrid vehicles or electric vehicles. Secondary batteries may be classified into a cylindrical type, a prismatic type, a pouch type (or a polymer type), etc. according to external shapes. Among these types, the prismatic battery may be formed by accommodating an electrode assembly including a separator interposed between a positive electrode plate and a negative electrode plate into a case with an electrolyte and installing a cap plate in (or on) the case.

The above information disclosed in this Background section is for enhancement of understanding of the background of the present disclosure, and therefore, it may contain information that does not constitute prior art.

SUMMARY

Embodiments of the present disclosure provide a secondary battery exhibiting improved assembling performance and an optimal design that satisfies heat generation characteristics.

A secondary battery according to an embodiment of the present disclosure includes: an electrode assembly including a negative electrode plate, a positive electrode plate, and a separator; a case having an open upper surface and accommodating the electrode assembly; a cap plate sealing the upper surface of the case; a negative electrode terminal on the cap plate; a positive electrode terminal on the cap plate; a first (e.g., horizontal) negative-electrode-current-collector plate extending along a lower side of the cap plate between the electrode assembly and the cap plate and having a first end electrically connected to the negative electrode plate and a second end electrically connected to the negative electrode terminal; and a first (e.g., horizontal) positive-electrode-current-collector plate extending along the lower side of the cap plate between the electrode assembly and the cap plate and having a first end electrically connected to the positive electrode plate and a second end electrically connected to the positive electrode terminal. The first positive-electrode-current-collector plate has a greater thickness than the first negative-electrode-current-collector plate, and the first negative-electrode-current-collector plate has a first protrusion that locally protrudes toward the electrode assembly.

A distance between an upper surface of the first negative-electrode-current-collector plate and a lower surface of the first protrusion may correspond to a thickness of the first positive-electrode-current-collector plate.

A distance between a lower surface of the first protrusion and the electrode assembly may correspond to a distance between a lower surface of the horizontal positive-electrode-current-collector and the electrode assembly.

The horizontal positive-electrode-current-collector plate may have a second protrusion that locally protrudes toward the electrode assembly.

A distance between an upper surface of the first negative-electrode-current-collector plate and a lower surface of the first protrusion may correspond to a distance between an upper surface of the horizontal positive-electrode-current-collector plate and a lower surface of the second protrusion.

A distance between a lower surface of the first protrusion and the electrode assembly may correspond to a distance between a lower surface of the second protrusion and the electrode assembly.

The secondary battery may further include: a second (e.g., vertical) negative-electrode-current-collector plate on one side of the electrode assembly and electrically connected to the negative electrode plate; and a second (e.g., vertical) positive-electrode-current-collector plate on another side of the electrode assembly and electrically connected to the positive electrode plate. A first end of the first negative-electrode-current-collector plate may be coupled to an upper end of the second negative-electrode-current-collector plate, and a first end of the first positive-electrode-current-collector plate may be coupled to an upper end of the second positive-electrode-current-collector plate.

According to embodiments of the present disclosure, a secondary battery is provided that exhibits improved assembling performance in which a protrusion is formed on a first (e.g., horizontal) negative current collector plate. The protrusion accounts for (or compensates for) a difference in thickness between the first negative current collector plate and the first (e.g., horizontal) positive current collector plate, and a space above the electrode assembly is consistently (or constantly) maintained, thereby preventing the electrode assembly from tilting during assembling while allowing for an optimal design that satisfies heat generation and cooling characteristics by having a first/horizontal positive electrode current collector with a greater thickness than a first/horizontal negative current collector plate.

DETAILED DESCRIPTION

Figure 1:
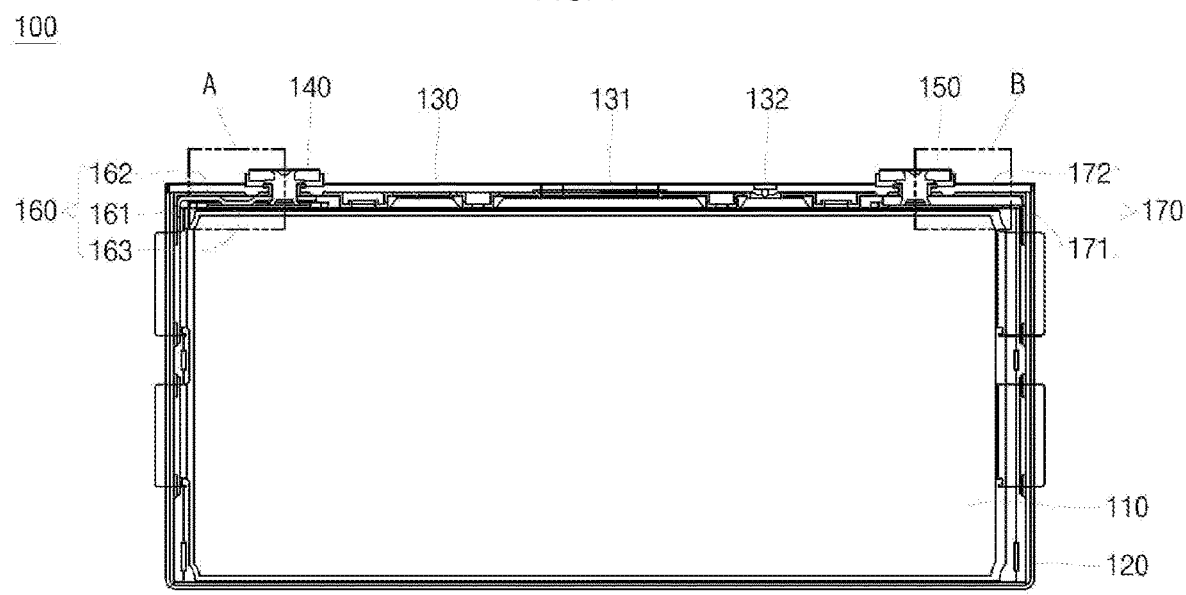
FIG. 1 is a cross-sectional view of a secondary battery according to an embodiment of the present disclosure.

Hereinafter, embodiments of the present disclosure will be described, in detail, with reference to the accompanying drawings.

Embodiments of the present disclosure are provided to more completely explain the present disclosure to those skilled in the art, and the embodiments described herein may be modified in various other forms. In other words, the present disclosure may be embodied in many different forms and should not be construed as being limited to the example embodiments described herein. Rather, these embodiments are provided so that this disclosure will be thorough and complete and will convey the aspects and features of the present disclosure to those skilled in the art.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Figure 2:
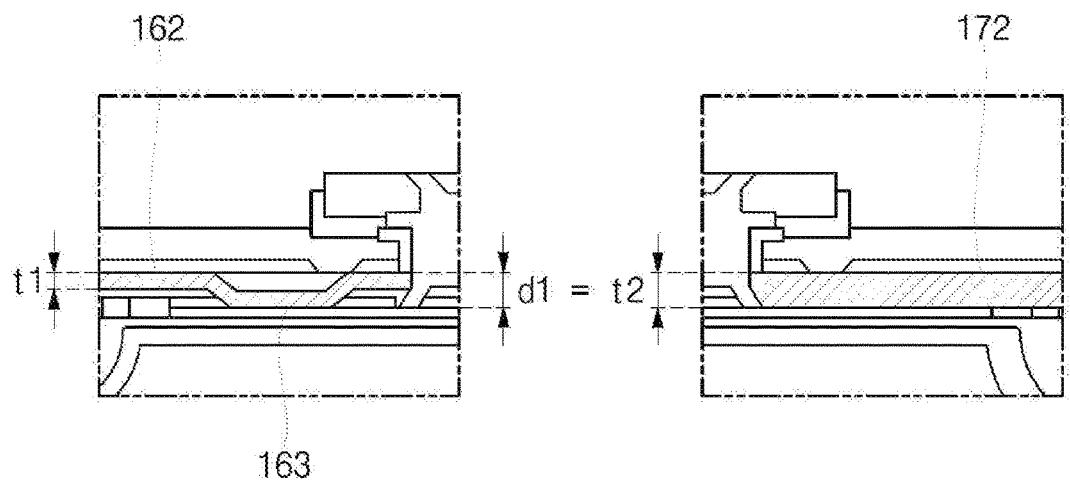
FIG. 2 is an enlarged view showing both areas A and B of FIG. 1.

FIG. 1 is a cross-sectional view of a secondary battery 100 according to an embodiment of the present disclosure, and FIG. 2 is an enlarged view showing areas A and B of FIG. 1.

Referring to FIG. 1, the secondary battery 100 according to an embodiment of the present disclosure includes an electrode assembly 110, a case 120, a cap plate 130, a negative electrode terminal 140, a positive electrode terminal 150, a negative electrode current collector 160, and a positive electrode current collector 170.

The electrode assembly 110 includes a negative electrode plate, a positive electrode plate, and a separator.

The negative electrode plate has, on a negative electrode current collector made of, for example, a copper or nickel foil, a negative electrode coating portion that is coated with a negative electrode active material made of, for example, carbon or graphite, and a negative electrode uncoated portion that is not coated with the negative electrode active material.

The positive electrode plate has, on a positive electrode current collector made of, for example, an aluminum foil, a positive electrode coating portion coated with a positive electrode active material made of, for example, a transition metal oxide, and a positive electrode uncoated portion that is not coated with the positive electrode active material.

The separator can be made of, for example, polyethylene, polypropylene, or a polyethylene and polypropylene composite film, as an insulator. The separator is interposed between the negative electrode plate and the positive electrode plate to prevent a short circuit between the negative electrode plate and the positive electrode plate while allowing the movement of, for example, lithium ions.

The electrode assembly 110 may be formed by stacking a plurality of negative electrode plates, separators, positive electrode plates, separators, etc. sequentially in that order (forming a so-called stack type electrode assembly) or may be formed by winding the same around one axis (forming a so-called jelly roll type electrode assembly). In the drawings, the electrode assembly 110 is shown as a stack type electrode assembly by way of example.

The case 120 may have a rectangular parallelepiped shape with an inner space (e.g., an open inner space), and one surface of the case 120 may be open. For convenience of understanding, the following description will describe an embodiment in which the upper surface of the case 120 is open on the basis of (e.g., the orientation of) the drawings. Accordingly, the case 120 may accommodate the electrode assembly 110, an electrolyte, etc. through the open upper surface.

The electrolyte may include, for example, an organic solvent, such as ethylene carbonate (EC), propylene carbonate (PC), diethyl carbonate (DEC), dimethyl carbonate (DMC), or ethyl methyl carbonate (EMC), and a lithium salt, such as $LiPF_6$ or $LibF_4$.

The cap plate 130, which is coupled to the upper end of the case 120, seals the open upper surface of the case 120. The cap plate 130 may include a safety vent 131, an electrolyte inlet 132, etc.

The safety vent 131 prevents an explosion by bursting in response to pressure generated when excessive gas is generated inside the case 120, thereby releasing the gas and reducing the pressure inside the case 120. To facilitate the bursting, the safety vent 131 may have a notch formed therein.

The electrolyte inlet 132 is for injecting the electrolyte into the case 120 after the cap plate 130 is installed, and the electrolyte inlet 132 is closed by a separate plug member after the electrolyte is injected.

In one embodiment, the negative electrode terminal 140 is insulated from the cap plate 130 by a separate insulating member and installed on the cap plate 130. The negative electrode terminal 140 is electrically connected to the negative electrode plate of the electrode assembly 110 by a negative electrode current collector 160, to be described later.

In one embodiment, the positive electrode terminal 150 is insulated from the cap plate 130 by a separate insulating member and installed on the cap plate 130. The positive electrode terminal 150 is electrically connected to the positive electrode plate of the electrode assembly 110 by a positive electrode current collector 170, to be described later.

The negative electrode current collector 160 may include a vertical negative-electrode-current-collector plate (e.g., a first negative-electrode-current-collector plate) 161 and a horizontal negative-electrode-current-collector plate (e.g., a second negative-electrode-current-collector plate) 162 to form a "Γ" shape (e.g., the vertical negative-electrode-current-collector plate 161 and the horizontal negative-electrode-current-collector plate 162 may form a substantially right angle at where they meet). However, the terms "vertical" and "horizontal" used herein do not mean that a component should be oriented mathematically strictly vertically or horizontally with respect to the ground. Instead, on the basis of the drawing, the vertical negative-electrode-current-collector plate 161 is oriented substantially vertically relative to the horizontal negative-electrode-current-collector plate 162 and the horizontal negative-electrode-current-collector plate 162 is oriented substantially horizontally relative to the vertical negative-electrode-current-collector plate 161. Accordingly, in this sense, the two negative electrode current collector plates 161 and 162 are merely referred to using their relative orientation to distinguish one from the other. To be clear, a configuration in which the vertical negative-electrode-current-collector plate 161 is not oriented vertically and/or the horizontal negative-electrode-current-collector plate 162 is not oriented horizontally is not excluded from the scope of the present disclosure. This is the same for a vertical positive-electrode-current-collector plate (e.g., a first positive-electrode-current-collector plate) 171 and a horizontal positive-electrode-current-collector plate (e.g., a second positive-electrode-current-collector plate) 172, to be described later.

The vertical negative-electrode-current-collector plate 161 is disposed on one side (e.g., the left side in the drawing) of the electrode assembly 110 and is electrically connected to the negative electrode uncoated portion of the negative electrode plate of the electrode assembly 110.

The horizontal negative-electrode-current-collector plate 162 is bent from an upper end of the vertical negative-electrode-current-collector plate 161 to extend along a lower side of the cap plate 130 between the electrode assembly 110 and the cap plate 130. An end of the horizontal negative-electrode-current-collector plate 162 is electrically connected to the negative electrode terminal 140.

The positive electrode current collector 170 may include the vertical positive-electrode-current-collector plate 171 and the horizontal positive-electrode-current-collector plate 172 and may formed a "⏋" shape.

The vertical positive-electrode-current-collector plate 171 is disposed on the other side (e.g., the right side in the drawing) of the electrode assembly 110 and is electrically connected to the positive electrode uncoated portion of the positive electrode plate of the electrode assembly 110.

The horizontal positive-electrode-current-collector plate 172 is bent from an upper end of the vertical positive-electrode-current-collector plate 171 to extend along the lower side of the cap plate 130 between the electrode assembly 110 and the cap plate 130. An end of the horizontal positive-electrode-current-collector plate 172 is electrically connected to the positive electrode terminal 150.

The positive electrode current collector 170 may have a greater thickness than the negative electrode current collector 160 to improve heating/cooling characteristics. Accordingly, however, there may be a difference in the space above the electrode assembly 110 between the horizontal negative-electrode-current-collector plate 162 and the horizontal positive-electrode-current-collector plate 172. That is, because a thickness t1 of the horizontal negative-electrode-current-collector plate 162 is smaller than a thickness t2 of the horizontal positive-electrode-current-collector plate 172, when the upper surface of the horizontal negative-electrode-current-collector plate 162 and the upper surface of the horizontal positive-electrode-current-collector plate 172 are aligned at the same height, the height of the lower surface of the horizontal negative-electrode-current-collector plate 162 with respect to the electrode assembly 110 is greater than the height of the lower surface of the horizontal positive-electrode-current-collector plate 172 with respect to the electrode assembly 110. Therefore, when assembling the secondary battery 100, the electrode assembly 110 may be tilted so that the side at where the horizontal negative-electrode-current-collector plate 162 is present is relatively lifted and the side at where the horizontal positive-electrode-current-collector plate 172 is present is relatively lowered.

According to an embodiment of the present disclosure, the secondary battery 100 has a protrusion 163 formed on the horizontal negative-electrode-current-collector plate 162. For example, the protrusion 163 in the horizontal negative-electrode-current-collector plate 162 locally downwardly protrudes. The protrusion 163 is formed such that a distance d1 between an upper surface of the horizontal negative-electrode-current-collector plate 162 and a lower end (or lower surface) of the protrusion 163 corresponds to the thickness t2 of the horizontal positive-electrode-current-collector plate 172 (e.g., a distance between the upper and lower surfaces of the horizontal positive-electrode-current-collector plate 172). In other words, the protrusion 163 is formed such that the distance between the lower end of the protrusion 163 and the electrode assembly 110 corresponds to a distance between the lower surface of the horizontal positive-electrode-current-collector plate 172 and the electrode assembly 110. Accordingly, by forming the protrusion 163, a difference between the thickness t1 of the horizontal negative-electrode-current-collector plate 162 and the thickness t2 of the horizontal positive-electrode-current-collector plate 172 can be compensated for, and thus, a space above the electrode assembly 110 can be consistently maintained, thereby preventing the electrode assembly 110 from tilting when assembling.

In the drawings, the protrusion 163 is illustrated as being a singular protrusion, but in other embodiments, the protrusion 163 may be formed in plural. In addition, in the drawings, the horizontal negative-electrode-current-collector plate 162 is illustrated as being locally bent downwardly at a region to form the protrusion 163, but in other embodiments, the horizontal negative-electrode-current-collector plate 162 may be formed to be locally thicker in the corresponding region than in other regions. In addition, the protrusion 163 may be integrally formed with the horizontal negative-electrode-current-collector plate 162 or may be formed separately from the horizontal negative-electrode-current-collector plate 162 and then attached to the horizontal negative-electrode-current-collector plate 162.

Figure 3:
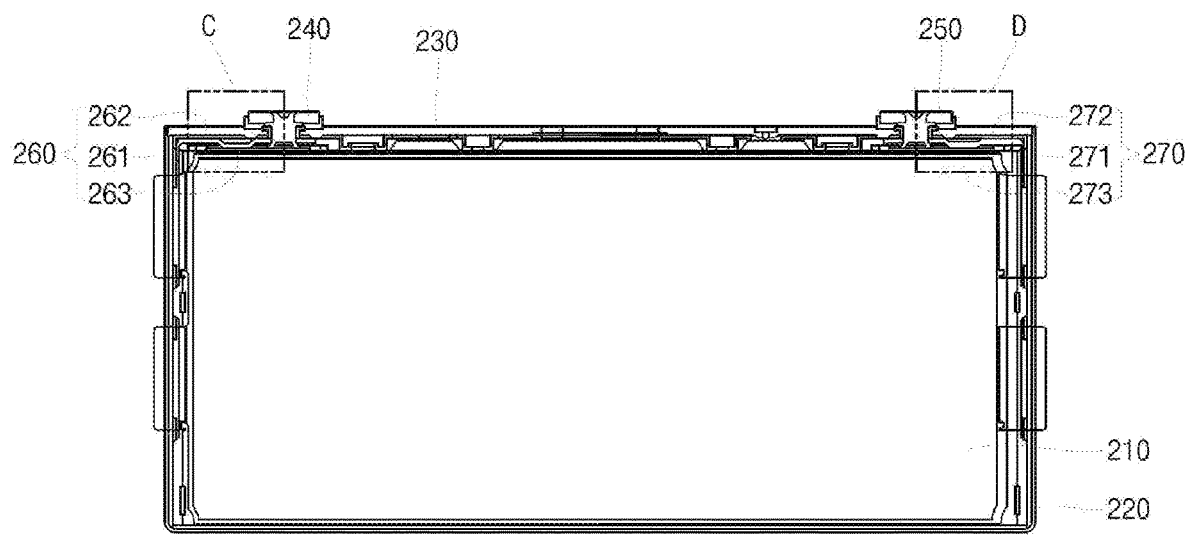
FIG. 3 is a cross-sectional view of a secondary battery according to another embodiment of the present disclosure.
Figure 4:
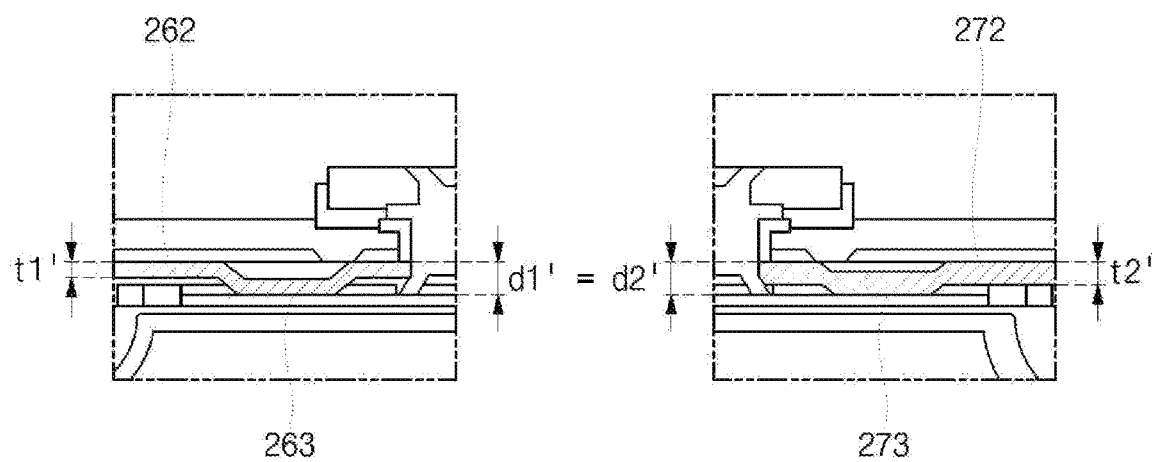
FIG. 4 is an enlarged view showing both areas C and D of FIG. 3.

FIG. 3 is a cross-sectional view of a secondary battery 200 according to another embodiment of the present disclosure, and FIG. 4 is an enlarged view of both areas C and D of FIG. 3.

Referring to FIG. 3, the secondary battery 200 includes an electrode assembly 210, a case 220, a cap plate 230, a negative electrode terminal 240, a positive electrode terminal 250, a negative electrode current collector 260, and a positive electrode current collector 270.

The electrode assembly 210, the case 220, the cap plate 230, the negative electrode terminal 240, and the positive electrode terminal 250 of the secondary battery 200 are substantially the same as the electrode assembly 110, the case 120, the cap plate 130, the negative electrode terminal 140, and the positive electrode terminal 150 of the secondary battery 100 described above with respect to FIGS. 1 and 2, and even if any differences are present, such differences are merely an extent to which those skilled in the art would naturally expect to change according to the following description. Accordingly, a redundant description of like components and arrangements will be omitted or greatly simplified.

The negative electrode current collector 260 may include a vertical negative-electrode-current-collector plate (e.g., a first negative-electrode-current-collector plate) 261 and a horizontal negative-electrode-current-collector plate (e.g., a second negative-electrode-current-collector plate) 262, that together form a "Γ" shape. However, as described above, the terms "vertical" and "horizontal" used herein may mean, on the basis of the drawing, that the vertical negative-electrode-current-collector plate 261 is oriented substantially vertically relative to the horizontal negative-electrode-current-collector plate 262 and the horizontal negative-electrode-current-collector plate 262 is oriented substantially horizontally relative to the vertical negative-electrode-current-collector plate 261. Accordingly, in this sense, these two negative electrode current collector plates 261 and 262 are merely referred to by reference to their orientations in the drawings to distinguish one the other. This is the same for a vertical positive-electrode-current-collector plate (e.g., a first positive-electrode-current-collector plate) 271 and a horizontal positive-electrode-current-collector plate (e.g., a second positive-electrode-current-collector plate) 272, which will be described later.

The vertical negative-electrode-current-collector plate 261 is disposed on one side (e.g., the left side in the drawing) of the electrode assembly 210 and is electrically connected to a negative electrode uncoated portion of a negative electrode plate of the electrode assembly 210.

The horizontal negative-electrode-current-collector plate 262 is bent from the upper end of the vertical negative-electrode-current-collector plate 261 to extend along a lower side of the cap plate 230 between the electrode assembly 210 and the cap plate 230. The horizontal negative-electrode-current-collector plate 262 has an end that is electrically connected to the negative electrode terminal 240.

The positive electrode current collector 270 may include the vertical positive-electrode-current-collector plate 271 and the horizontal positive-electrode-current-collector plate 272 that may together form a "˥" shape.

The vertical positive-electrode-current-collector plate 271 is disposed on another side (e.g., the right side in the drawing) of the electrode assembly 210 and is electrically connected to a positive electrode uncoated portion of a positive electrode plate of the electrode assembly 210.

The horizontal positive-electrode-current-collector plate 272 is bent from the upper end of the vertical positive-electrode-current-collector plate 271 to extend along the lower side of the cap plate 230 between the electrode assembly 210 and the cap plate 230. The horizontal positive-electrode-current-collector plate 272 has an end that is electrically connected to the positive electrode terminal 250.

The positive electrode current collector 270 may have a greater thickness than the negative electrode current collector 260 to provide optimal heating/cooling characteristics. Accordingly, however, there may be a difference in the space above the electrode assembly 210 with respect to the horizontal negative-electrode-current-collector plate 262 compared to the horizontal positive-electrode-current-collector plate 272.

The secondary battery 200 has a first protrusion 263 that locally downwardly protrudes on the horizontal negative-electrode-current-collector plate 262 and a second protrusion 273 that locally downwardly protrudes on the horizontal positive-electrode-current-collector plate 272. The first protrusion 263 and the second protrusion 273 are formed such that a distance d1' between an upper surface of the horizontal negative-electrode-current-collector plate 262 and a lower end of the first protrusion 263 corresponds to a distance d2' between N upper surface of the horizontal positive-electrode-current-collector plate 272 and A lower end of the second protrusion 273. For example, the first protrusion 263 and the second protrusion 273 are formed such that the distance between the lower end of the first protrusion 263 and the electrode assembly 210 corresponds to the distance between the lower end of the second protrusion 273 and the electrode assembly 210. For example, when the thickness t1' of the horizontal negative-electrode-current-collector plate 262 is about 1.2 mm and the thickness t2' of the horizontal positive-electrode-current-collector plate 272 is about 1.8 mm, the first protrusion 263 is formed to protrude downwardly by about 1 mm and the second protrusion 273 is formed to protrude downwardly by about 0.4 mm. Accordingly, due to the first protrusion 263 and the second protrusion 273, the space above the electrode assembly 210 can be consistently maintained.

The foregoing embodiments are example embodiments of the present disclosure, which is not limited to the embodiment. It will be understood by a person skilled in the art that various changes in form and details may be made to the described embodiments without departing from the spirit and scope of the present disclosure as defined by the following claims and their equivalents.

What is claimed is:

1. A secondary battery comprising:
an electrode assembly comprising a negative electrode plate, a positive electrode plate, and a separator;
a case having an open upper surface and accommodating the electrode assembly;
a cap plate sealing the upper surface of the case;
a negative electrode terminal on the cap plate;
a positive electrode terminal on the cap plate;
a first negative-electrode-current-collector plate extending along a lower side of the cap plate between the electrode assembly and the cap plate and having a first end electrically connected to the negative electrode plate and a second end electrically connected to the negative electrode terminal; and
a first positive-electrode-current-collector plate extending along the lower side of the cap plate between the electrode assembly and the cap plate and having a first end electrically connected to the positive electrode plate and a second end electrically connected to the positive electrode terminal,
wherein the first positive-electrode-current-collector plate has a greater thickness than the first negative-electrode-current-collector plate,
wherein the first negative-electrode-current-collector plate has a first protrusion that locally protrudes toward the electrode assembly, and
wherein a distance between an upper surface of the first negative-electrode-current-collector plate and a lower surface of the first protrusion corresponds to a thickness of the first positive-electrode-current-collector plate.

2. The secondary battery of claim 1, wherein a distance between a lower surface of the first protrusion and the electrode assembly corresponds to a distance between a lower surface of the first positive-electrode-current-collector plate and the electrode assembly.

3. The secondary battery of claim 1, wherein the first positive-electrode-current-collector plate has a second protrusion that locally protrudes toward the electrode assembly.

4. The secondary battery of claim 3, wherein a distance between an upper surface of the first negative-electrode-current-collector plate and a lower surface of the first protrusion corresponds to a distance between an upper surface of the first positive-electrode-current-collector plate and a lower surface of the second protrusion.

5. The secondary battery of claim 3, wherein a distance between a lower surface of the first protrusion and the electrode assembly corresponds to a distance between a lower surface of the second protrusion and the electrode assembly.

6. The secondary battery of claim 1, further comprising:
a second negative-electrode-current-collector plate on one side of the electrode assembly and electrically connected to the negative electrode plate,
wherein the first end of the first negative-electrode-current-collector plate is coupled to an upper end of the second negative-electrode-current-collector plate.

7. The secondary battery of claim 6, further comprising a second positive-electrode-current-collector plate on another side of the electrode assembly and electrically connected to the positive electrode plate,
wherein the first end of the first positive-electrode-current-collector plate is coupled to an upper end of the second positive-electrode-current-collector plate.

8. The secondary battery of claim 1, wherein the first protrusion is formed in the singular.

9. The secondary battery of claim 1, wherein the first protrusion is formed in plural.

10. The secondary battery of claim 1, wherein the first protrusion is formed in such a manner that the first negative-electrode-current-collector plate is locally bent downwardly in a region.

11. The secondary battery of claim 1, wherein the first protrusion is formed in such a manner that the first negative-electrode-current-collector plate is formed to be locally thicker in a region than in other regions.

12. The secondary battery of claim 1, wherein the first protrusion is formed integrally with the first negative-electrode-current-collector plate.

13. The secondary battery of claim 12, wherein the first protrusion is attached to the first negative-electrode-current-collector plate.

14. The secondary battery of claim 1, wherein the first protrusion is formed separately from the first negative-electrode-current-collector plate.

15. The secondary battery of claim 1, wherein the negative electrode terminal is insulated from the cap plate by an insulating member.

16. The secondary battery of claim 1, wherein the positive electrode terminal is insulated from the cap plate by an insulating member.

17. The secondary battery of claim 1, wherein the cap plate comprises a safety vent.

18. The secondary battery of claim 1, wherein the cap plate comprises an electrolyte inlet.

19. The secondary battery of claim 1, wherein the case has a rectangular parallelepiped shape.

* * * * *